(12) United States Patent
Gock et al.

(10) Patent No.: US 8,574,339 B2
(45) Date of Patent: Nov. 5, 2013

(54) METHOD FOR THE SELECTIVE ACIDIC DEZINCIFICATION OF STEEL SCRAP

(75) Inventors: Eberhard Gock, Goslar (DE);
Hans-Bernd Pillkahn, Werdohl (DE);
Udo Meynerts, Mulheim a. d. Ruhr (DE)

(73) Assignee: DRT Deutsche Rohstofftechnik GmbH (DE)

( * ) Notice: Subject to any disclaimer, the term of this patent is extended or adjusted under 35 U.S.C. 154(b) by 181 days.

(21) Appl. No.: 13/120,534

(22) PCT Filed: Sep. 23, 2009

(86) PCT No.: PCT/EP2009/006846
§ 371 (c)(1),
(2), (4) Date: Jul. 7, 2011

(87) PCT Pub. No.: WO2010/034465
PCT Pub. Date: Apr. 1, 2010

(65) Prior Publication Data
US 2011/0271796 A1    Nov. 10, 2011

(30) Foreign Application Priority Data

Sep. 23, 2008 (DE) .......................... 10 2008 048 493

(51) Int. Cl.
*C22B 3/06* (2006.01)
*C22B 19/30* (2006.01)
(52) U.S. Cl.
USPC ................................. 75/401; 75/715; 75/743
(58) Field of Classification Search
USPC ...................................... 75/401, 715; 423/109
See application file for complete search history.

(56) References Cited

U.S. PATENT DOCUMENTS 3,905,882 A * 9/1975 Hudson et al. ................ 205/607
5,716,913 A * 2/1998 Yamamoto et al. ........... 508/365
5,980,725 A * 11/1999 Campenon et al. ........... 205/602

* cited by examiner

*Primary Examiner* — Roy King
*Assistant Examiner* — Tima M McGuthry Banks
(74) *Attorney, Agent, or Firm* — Berliner & Associates

(57) ABSTRACT

Complete dezincing of steel scrap is achieved by the addition of oils, whereupon the dissolution of iron is substantially suppressed through the autogenous inhibition effect of the oils. The steel scrap arising when the dezincing process has been completed is protected against corrosion by the remaining film of oil, the corrosion protection preventing the formation of iron oxide layers and thus blackening of the scrap material. The oil discharged with the dezincing solution can be separated as a pure phase by resorting to flotation in support of the process and can then be reused as an inhibitor.

14 Claims, No Drawings

METHOD FOR THE SELECTIVE ACIDIC DEZINCIFICATION OF STEEL SCRAP

The initial dezincing of steel scrap, in particular feed material used in the foundry industry, must take place for process and equipment-specific reasons in the framework of induction furnace technology. In view of the growing tendency to apply the corrosion protection treatment by galvanizing to the entire field of automotive and traffic engineering pre-dezincing measures become more and more indispensable to enable zinc-free steel scrap to be made available in sufficient amounts for use in foundries. The production-integrated dezincing as it is nowadays commonly utilized in the steel industry with the subsequent concentration of zinc oxide in the rolling process, said oxide being fed to zinc production plants as secondary raw material, can only be adopted by the foundry industry when the induction furnace technology is first appropriately modified, for example by sectionally pre-heating under vacuum.

For that reason, hydrometallurgical processes are of particular interest. Due to the amphoteric character of zinc both an acidic and a basic approach can be adopted. The problem with the basic approach is that great amounts of energy are needed in view of the high temperature involved (>80° C.), the poor capacity resulting from the low maximum zinc concentration (appr. 30 g/l) and the long reaction time (appr. 60 min.).

When making use of the acidic approach the process takes place at room temperature with zinc concentrations of 130 g/l being achieved. The reaction period comes to 20 min. maximum. The significant disadvantage of this approach is that iron is dissolved simultaneously. As it is known from the law of the electro-chemical series of elements a direct electrolytic recovery of zinc in the presence of iron is impossible so that the leaching solution needs to be comprehensively cleaned which may result in the process becoming uneconomical. The objective of the acidic leaching process must therefore focus on keeping the iron content at a minimum. Since this is not feasible for thermodynamic reasons various attempts have been made to suppress the simultaneous dissolution of iron.

In 1972 the Societe de Prayon disclosed a patent [Treatment of galvanized scrap iron by a wet method, Patent No. BE 773 906] according to which $H_2SO_4$ was to be used to bring about an independent recycling of zinc and iron from galvanized scrap. The process adopted an aqueous $H_2SO_4$ to which a colloidal flocculant, for example gelatine, bone marrow, starch, dextrin, guar gum or poly-acrylamide was to be added as inhibitor to delay the dissolution of iron. The concentration of the colloid added may range between 20 and 200 g/m³. With 20 to 200 g of free sulfuric acid per liter the leaching process is carried out at temperatures ranging between 5 and 40° C., preferably at 20° C. Zinc recovery is achieved by means of electrolysis.

Another Indian patent taken out in 1977 by Council of Scientific and Industrial Research [Council of Scientific and Industrial Research, India (Marthur, Prem Behari; Venkatakrishan, Narasimhan): Dezincing of steel scrap by leaching with inhibitor impregnated acid, Patent No. IN 143 253] relates to the use of 25-32-% $H_2SO_4$ or HCl in the presence of 0.25-2% formaldehyde as inhibitor to counteract the dissolution of iron. The temperature range was stated to range between 15 and 45° C.

In 1999 British Steel Ltd.; Corus UK Ltd. [British Steel Ltd.; Corus UK Ltd. (Cosgrove, Martin; Weaver, Robert Wilton): Acidic bath for removal of coatings from scrap metal in recycling, Patent No. GB 2,334,969] obtained a patent which was aimed at removing not only zinc coatings bus also organic as well as tin coatings. The acidic bath contained 1-4% of HCl, 10-25% of iron chloride and <0.05% of an inhibitor on amine basis. Optionally, spent pickling solutions used in the treatment of steel are also conceivable. The steel scrap is treated in the acidic bath under frictional contact produced by tumbling in a perforated plate system.

From GB 500 760 a process for the dezincing of steel scrap is known according to which an organic compound is employed as inhibitor with a view to reducing the dissolution of iron, said compound containing a sulfur atom and a substituted or unsubstituted amino group. Here, a sulfonamide and a thiocarbanilide were named as examples of relevant inhibitors.

Common to all these methods is that specific reagents which cannot be recycled are to be used as iron dissolution counteracting inhibitors. However, the dissolution of iron cannot be suppressed completely. What is more, many of the reagents used are very expensive and have to be conditioned in a preceding process step because an interfacial reaction is involved. Without exception, a new component is introduced into the system the effects of which are not assessable, for example with respect to the recovery of zinc by electrolysis.

It has now been found that the above described shortcomings associated with the use of inhibitors can be eliminated if sheet scrap is used that has been wetted with oil, in particular mineral oil. This, for example, is the case with steel scrap directly stemming from transformation processes employed in the automotive industry. Usually, this sheet scrap has been wetted by drawing oils or wash oils.

Surprisingly it turned out, however, that the oil film on the scrap enabled zinc to be selectively dissolved whereas the dissolution of iron could be delayed by a factor of up to 10.6. What could have been expected in this respect was that the oil would cause the dezincing process to be impeded but as was ascertained dezincing was in fact not interfered with at all, and exclusively the dissolution of iron was inhibited.

Typically, the steel scrap to be dezinced is provided with an oil film before the dezincing process starts, and oil wetting may perhaps be waived in cases where the scrap has already been provided with an oil coating. The oil content should range between 0.1 and 3% w/w in relation to the steel scrap. Increasing the oil content to 3% w/w enables the inhibition effect to be carried out in an autogenous manner because the oil and acidic solution are quite effectively separated during leaching and washing so that the oil phase may be directly used again for the conditioning of the sheet scrap feed. The removal of oil may be brought about by phase separation. For example, the oil discharged with the dezincing solution may be withdrawn from the surface of the dezincing solution as a pure oil phase by resorting to flotation supporting the process. Moreover, a highly valuable side effect is achieved through the residual oil film which remains on the dezinced sheet scrap and thus produces a corrosion preventing protective layer so that the scrap can be fed to the subsequent foundry process without surface oxidation. Also beneficial in this case is that this also increases the storage life of the dezinced steel scrap. The thin oil film remaining on the dezinced scrap material thus improves the quality of the scrap and in this manner adds value to the product. In all hitherto known pyrometallurgical and hydrometallurgical pre-dezincing processes oxidation reactions occur and cause so-called black scrap with iron oxide layers to be produced. High iron oxide content leads to faulty production batches in the foundry or casting process.

An acidic solution, as a rule a sulfuric acid solution, is used for the dezincing process in which connection the acid concentration may range between 20 and 250 g/l, in particular between 100 and 200 g/l. The temperature at which dezincing takes place usually ranges between 15 and 60° C., in particular between 20 and 30° C., preferably at approx. 25° C. To accelerate the dissolution of zinc, metal ions, especially copper or nickel ions, may be added to the dezincing solution.

The zinc-containing solutions exhibit zinc concentrations of up to 130 g/l at iron contents of 0.7 g/l which minimizes waste problems otherwise associated with the separation of iron. In the event process acids are employed for dezincing as they arise in the zinc electrolysis process the zinc-rich solution so obtained may again be fed without difficulty to the zinc recovery process of a zinc production plant. The residual oil content of 100 mg/l is eliminated there in the iron precipitation stage so that negative effects in the electrolysis process can be ruled out. Basically, combining the dezincing process with the process of primary zinc recovery from zinc ore is feasible when using for dezincing the acid which is also employed for leaching the zinc oxide from the zinc ore. Prior to electrolysis cleaning steps are as a rule required which are basically known from the state of the art, for example solid/liquid separation, iron precipitation, chemical precipitation processes or cementation with zinc dust.

The method proposed by the invention is substantiated by the following examples:

EXAMPLE 1

Galvanized mixed sheet scrap of an automotive manufacturer with approx. 14 g Zn per kg of steel has been reduced in size to an average dimension of 4 cm×4 cm.

100 g of the material was leached at 25° C. by means of 100 ml of diluted sulfuric to acid which had an initial acid concentration of 190 g $H_2SO_4$/l. The condition of the sheet surfaces was changed. A test conducted with oil-free sheets was compared to tests with drawing and wash oil containing sheets. The oil content ranged between 0.7 and 1.7%. The results are summarized in Table 1.

TABLE 1

Single-stage dezincing of oil-free and oil-containing sheets

| Leaching time [min] | Oil-free | | Oil-coated | | | |
| --- | --- | --- | --- | --- | --- | --- |
| | | | Wash oil (0.7%) | | Drawing oil (1.7%) | |
| | Zinc content [g/l] | Iron content [g/l] | Zinc [g/l] | Iron [g/l] | Zinc [g/l] | Iron [g/l] |
| 3 | 13.7 | 0.26 | 12.3 | 0.11 | 12.8 | 0.08 |
| 5 | 13.7 | 0.39 | 13.3 | 0.12 | 14.0 | 0.08 |
| 7 | 14.1 | 0.61 | 14.0 | 0.11 | 14.5 | 0.09 |
| 10 | 14.1 | 0.82 | 14.1 | 0.11 | 14.7 | 0.1 |
| 15 | 14.2 | 1.22 | 14.5 | 0.17 | 14.9 | 0.14 |
| 20 | 14.3 | 1.60 | 14.7 | 0.17 | 15.2 | 0.17 |

After 7 min. a comparison of the iron concentration of oil-free and oil-coated sheets revealed a ratio of 5.5 with respect to wash oil and 8.1 for drawing oil. At a longer reaction time of 20 min this factor increased to 10.6 in the case of wash oil and also 10.6 with respect to drawing oil.

For process-technological implementation purposes this result means that other than with acidic leaching without inhibitors the process becomes increasingly stable and the relative dissolution of iron diminishes as the leaching time increases.

EXAMPLE 2

Practice-oriented test were conducted with the same material in such a manner that spent electrolyte from a zinc production plant was used that showed 190 g of $H_2SO_4$/l and a zinc concentration of 50 g/l. Initially, oil-free plate sheet batches of 100 g each were fed in stepwise (at 7-minute intervals), with the advantage of coating the sheets with oil being evident from Example 3. Such a stepwise processing method is necessary to achieve a maximum zinc concentration increase. The results are summarized in Table 2.

TABLE 2

Multistage dezincing of oil-free plate sheets

| Leaching stage | Zinc content [g/l] | Iron content [g/l] |
| --- | --- | --- |
| 1 | 61.0 | 0.5 |
| 2 | 75.4 | 1.1 |
| 3 | 92.5 | 1.7 |
| 4 | 106.0 | 2.1 |
| 5 | 119.9 | 2.3 |
| 6 | 132.9 | 2.4 |

The relatively low iron dissolution rate is due to the short reaction time. As the reaction duration increases which will be necessary to achieve complete dezincing a linear rise of the iron content occurs so that the economic efficiency of the process becomes questionable.

EXAMPLE 3

In comparison to Example 2 the same test was repeated with a coating of 2.8% of drawing oil applied. The results obtained are shown in Table 3.

TABLE 3

Multistage dezincing of sheets treated with drawing oil

| Leaching stage | Zinc content [g/l] | Iron content [g/l] | Inhibitor effect [%] | Factor |
| --- | --- | --- | --- | --- |
| 1 | 64.7 | 0.09 | 79.9 | 4.97 |
| 2 | 78.9 | 0.10 | 81.8 | 5.50 |
| 3 | 93.2 | 0.34 | 79.7 | 4.93 |
| 4 | 105.9 | 0.47 | 77.9 | 4.53 |
| 5 | 115.4 | 0.58 | 74.6 | 3.94 |
| 6 | 118.7 | 0.69 | 71.4 | 3.49 |

As can be seen from the table the iron dissolution rate was reduced by a factor of 5.5 due to the inhibitor effect of the oil. It is now possible to carry out the leaching process in two stages, whereupon the inhibitor effect achieved in the first process stage should bring about an 80% reduction of the iron dissolution rate.

As can be seen from the above examples the process technology claimed offers optimizing potential with respect to the suppression of the iron dissolution in that the process configuration can be of two-stage design. This means, the first stage is completed when the iron dissolution factor ranges between 5 and 6.

The invention claimed is:
1. Method for the dezincing, by leaching by dissolution of zinc from iron-containing steel scrap in an acidic solution, characterized in that the dezincing is effected in the presence of oil, the oil inhibiting co-leaching by dissolution of iron.

2. Method according to claim 1, characterized in that this oil is a mineral oil.

3. Method according to claim 1, characterized in that the oil is a drawing oil or a wash oil.

4. Method according to claim 1, characterized in that the oil is provided for dezincing at a mass proportion ranging between 0.1 and 3% in relation to the steel scrap.

5. Method according to claim 1 characterized in that the acidic solution contains sulfuric acid.

6. Method according to claim 1, characterized in that the dezincing is carried out at an acid concentration ranging between 20 and 250 g/l.

7. Method for the dezincing of steel scrap in an acidic solution, characterized in that the dezincing is effected in the presence of oil and the oil is separated during or after dezincing.

8. Method according to claim 7 characterized in that oil is used for pretreatment of steel scrap prior to dezincing and then separated, wherein the separated oil is reused for said pre-treatment.

9. Method according to claim 1, characterized in that the dissolution of iron is reduced by a factor of up to 10.6 in comparison with an oil-free dezincing process.

10. Method according to claim 1, characterized in that the dezincing is effected at a temperature ranging between 15° C. and 60° C.

11. Method according to claim 1, characterized in that said acidic solution is obtained at least partially as an acidic zinc solution produced during the dissolution of zinc oxide extracted from zinc ore.

12. Method according to claim 1, characterized in that copper and/or nickel ions are added to the acidic solution with a view to accelerating said dezincing.

13. Method according to claim 1, characterized in that after the dezincing of steel scrap the dissolved zinc is recovered from the acidic solution in metallic form by means of electrolysis.

14. Method according to claim 1, characterized in that the oil forms a thin film on the surface of the dezinced steel scrap, thereby protecting said surface against corrosion, resulting in added value being given to the dezinced steel scrap.

* * * * *